United States Patent

[11] 3,626,033

| [72] | Inventors | Henno Keskkula<br>Midland;<br>Arthur A. Pettis, Saginaw, both of Mich. |
|------|-----------|-----|
| [21] | Appl. No. | 775,100 |
| [22] | Filed | Nov. 12, 1968 |
| [45] | Patented | Dec. 7, 1971 |
| [73] | Assignee | The Dow Chemical Company<br>Midland, Mich. |

[54] VINYL CHLORIDE RESINS WITH HIGH HEAT DEFORMATION AND IMPACT
8 Claims, No Drawings

| [52] | U.S. Cl. | 260/876 R, 260/899 |
|------|----------|-----|
| [51] | Int. Cl. | C08f 29/24, C08f 41/12 |
| [50] | Field of Search | 260/876, 899 |

[56] References Cited
UNITED STATES PATENTS

| 3,406,136 | 10/1968 | Scarso et al. | 260/876 |
|-----------|---------|---------------|---------|
| 3,231,524 | 1/1966 | Simpson | 260/899 |
| 3,053,800 | 9/1962 | Grabowski et al. | 260/876 |
| 2,971,939 | 2/1961 | Baer | 260/876 |
| 2,483,959 | 10/1949 | Baer | 260/45.75 |

*Primary Examiner*—Murray Tillman
*Assistant Examiner*—H. Roberts
*Attorneys*—Griswold & Burdick, H. L. Aamoth and Albin R. Lindstrom

ABSTRACT: High heat deformation and high impact vinyl chloride resins are prepared by blending a resin such as polyvinyl chloride or copolymers of vinyl chloride containing at least about 80 percent vinyl chloride with a polydiene rubber nitrile graft copolymer such as a styrene/acrylonitrile polybutadiene graft copolymer and an anhydride containing copolymer such as styrene-maleic anhydride.

VINYL CHLORIDE RESINS WITH HIGH HEAT DEFORMATION AND IMPACT

BACKGROUND OF THE INVENTION

Polyvinyl chloride and like resins are widely used plastic materials and are generally chemically inert showing excellent resistance to acids, salts and a wide variety of solvents as well as having good flame resistance or self-extinguishing properties. Vinyl chloride resins are readily plasticized and fabricated into a variety of useful objects and more recently the resins have been used in the unplasticized or slightly plasticized state to produce a variety of more rigid articles, particularly moldings, piping, sheets, etc. of value in the construction industry and elsewhere. However, unplasticized vinyl chloride resins are brittle and have poor impact properties. Additionally the resins have relatively low heat deformation characteristics which further limit their use.

Attempts have been made to improve either or both of these two important properties. U.S. Pat. No. 2,802,809 proposes to improve the impact property of polyvinyl chloride by incorporating a graft copolymer of a rubbery polydiene polymer with the resin. While significant improvement in impact was obtained the heat distortion temperatures of the blend were at best no better than the unmixed polyvinyl chloride. A ternary composition was proposed in U.S. Pat. No. 3,053,800 comprising a blend of polyvinyl chloride, a graft copolymer of a rubbery polymer and a copolymer of, for example, styrene and acrylonitrile. However, the heat distortion temperature of the mixture is not greatly improved.

It would be desirable to have a vinyl chloride resin with higher heat distortion (deformation) temperatures than hitherto obtainable without adversely affecting the other properties such as impact, etc.

SUMMARY OF THE INVENTION

Accordingly, a ternary composition of which a vinyl chloride resin constitutes a predominant proportion thereof has been found which provides improved heat deformation properties and retention of good impact and other physical properties.

The ternary composition comprises a blend of (a) from about 50 to 75 weight percent of a vinyl chloride resin, (b) from about 10 to 35 weight percent of a polydiene rubber nitrile graft copolymer and (c) from 15 to 35 weight percent of an anhydride containing copolymer such as styrene-maleic anhydride.

DETAILED DESCRIPTION OF THE INVENTION

The ternary composition of this invention comprises a predominant proportion of a vinyl chloride resin. The vinyl chloride resin may be a homopolymer of vinyl chloride or a copolymer of vinyl chloride with a minor proportion of one or more monomers copolymerizable with vinyl chloride. The vinyl chloride comprises at least about 80 percent of said copolymer and the copolymerizable monomer comprises up to about 20 percent. A wide variety of copolymerizable monomers may be used to prepare said vinyl chloride copolymer and include vinylidene chloride; vinyl acetate and vinyl stearate; acrylic and methacrylic acid esters; olefins such as ethylene, isopropylene and the like; allyl compounds such as allyl chloride; diolefins such as butadiene, isoprene, chloroprene and the like; or mixtures thereof. Further the vinyl chloride resins include halogenated polyvinyl chloride and the like.

The polydiene rubber nitrile graft copolymers are well known and methods for their preparation has been adequately described in the literature, such as is found in U.S. Pat. No. 3,053,800, U.S. Pat. No. 2,802,809 and elsewhere. Briefly the graft copolymers are generally produced by adding a monomeric mixture containing a vinyl nitrile monomer to an already completely or nearly completely free-radical polymerized polydiene rubber and free-radical polymerization is then continued to prepare the graft copolymer. It is believed that during copolymerization the monomers combine with active sites along the already polymerized polydiene rubber resulting in branching or the formation of side chains of polymerized monomers attached to the polydiene rubber polymer chains. Whether or not this is the mechanism involved the monomers appear to combine with themselves and said rubber in such a manner that only small amounts of polymers or copolymers which would result from the monomer mixture alone can be separated from the graft copolymer product. Such a product is referred to herein as a polydiene rubber nitrile graft copolymer.

Polydiene rubbers (elastomers) may be prepared in accordance with any usual or suitable procedure in this art. Preferably the rubber is polybutadiene, but polydiene rubbers prepared from a mixture of conjugated diolefins, or rubbers which comprise at least 60 weight percent of a conjugated diolefin and the balance comprised of copolymerizable monomers may also be used and are included within the term polydiene rubber as used herein. Conjugated diolefins include butadiene, isoprene, chloroprene and the like. Suitable copolymerizable monomers include acrylonitrile and methacrylonitrile; alkenyl aromatic monomers such as styrene, α-methyl styrene, vinyl toluene, halogenated styrenes such as chlorostyrene, alkylated styrenes such as t-butyl styrene, and the like; and a large variety of other known monomers including divinyl benzene and the like.

The mixture of grafting monomers suitable for preparing the polydiene rubber nitrile graft copolymers comprises a vinyl nitrile monomer and at least one other copolymerizable monomer. Vinyl nitriles include acrylonitrile, methacrylonitrile and the like. Copolymerizable monomers include alkenyl aromatic monomers such as have been previously described, lower alkyl esters of acrylic and methacrylic acid such as methyl methacrylate and the like. The ratio of the copolymerizable monomer to the nitrile monomer may be varied from about 85/15 to 65/35. The polydiene rubber nitrile graft copolymer comprises from about 40 to 70 weight percent of said polydiene rubber with the balance comprising the above monomer mixture.

EXAMPLE 1

Preparation of Polybutadiene Rubber Nitrile Graft Copolymer

Into a 20 gallon Pfaudler reactor was loaded 31.25 lbs. of a commercial polybutadiene latex, 60 percent solids (FRS 2004), 243.6 gms. of sodium salts of mixed rosin acids (Dresinate 731) 25.3 gms. of NaOH, 121.2 gms. of dextrose and 62.5 lbs. of water. The ingredients were mixed, the reactor purged with nitrogen, the contents heated to 60° C. and an iron complex added. The iron complex contained 6.1 gms. of $FeSO_4 \cdot 7bH_2O$, 61 gms. of sodium pyrophosphate and 12.5 lbs. of water.

A mixture of 13.5 lbs. of styrene, 5.25 lbs. of acrylonitrile and 90.6 gms. of cumene hydroperoxide was prepared and added to the reactor in four equal portions spaced about 20 minutes apart. After the last portion was added the polymerization was continued for about 3½ hours. The latex was then cooled, diluted with water, coagulated with 1 percent aluminum sulfate solution and the copolymer filtered. The coagulated product was then dried in a vacuum oven overnight. About 34 lbs. of a white powdery polybutadiene-styrene/acrylonitrile graft copolymer was obtained.

Anhydride containing polymers useful with this invention are prepared to contain in polymerized form from about 15 to 30 weight percent of an unsaturated dicarboxylic acid anhydride and from about 85 to 70 weight percent of a monomer or monomers copolymerizable therewith. The anhydride and from about 85 to 70 weight percent of a monomer or monomers copolymerizable therewith. The anhydride copolymer should have a viscosity of at least about 4 c.p.s. measured as a 10 percent by weight solution in methyl ethyl ketone at 25° C. Anhydride copolymers having viscosities as high as 10 c.p.s. or even higher may be used.

Unsaturated dicarboxylic acid anhydrides which are suitable include maleic anhydride, citraconic anhydride, itaconic anhydride and the like. Copolymerizable monomers may be selected from a wide variety of monomers but preferably are selected from the alkenyl aromatic monomers, such as styrene, previously described. Other types of monomers which may be used, chiefly as partial replacement for the alkenyl aromatic monomers, include such monomers as alkyl esters of acrylic and methacrylic acid, vinyl ethers, acrylonitrile, methacrylonitrile and like monomers. The preparation of anhydride copolymers is taught in the art, as for example, the continuous methods described in U.S. Pat. No. 2,769,804 and U.S. Pat. No. 3,336,267. The latter patent discloses methods of preparing substantially homogeneous copolymers which may advantageously be used in this invention.

The ternary compositions are a uniform admixture of from 50 to 75 weight percent of a vinyl chloride resin, from 10 to 35 weight percent of a polydiene rubber nitrile graft copolymer and from 15 to 35 weight percent of an anhydride copolymer. Various methods of blending or mixing may be used to prepare the ternary compositions such as by milling the components on a roll mill with heated rolls until a uniform blend is produced. These blends characteristically provide a smooth blanket on the hot rolls. Also, when two or more of the components are available in latex or emulsion form they may be mixed and coagulated together. It is sometimes of advantage to further blend the coagulated components by milling and the like.

Ternary compositions of this invention are particularly useful in preparing rigid articles such as pipe, fittings, sheet etc. where the advantageous properties of high heat deformation and where high impact is desired. Said compositions are superior replacements for the previously known vinyl chloride formulations used to prepare piping, ductwork, vessels, pump and fan vanes, etc.

The following nonlimiting examples will further illustrate the invention. Unless otherwise specified all parts and percentages are by weight.

EXAMPLE 2

A ternary blend was prepared by first mixing polyvinyl chloride (PVC) in a blender at 90° C. for 40 minutes with 3.5 parts of dioctyl phthalate (DOP), 10 parts of a proprietary organotin-sulfur complex (Thermolite RS-31) as a heat stabilizer and one part of mineral oil. The formulated PVC was then blended in varying amounts, shown in the table, with the polydiene rubber nitrile graft copolymer of example 1 and a styrene maleic anhydride copolymer (SMA) containing 18 percent maleic anhydride and having a viscosity of 8 c.p.s. The time of compounding varied between 15 and 20 minutes after which the blend was ground into small particles. Compression molded samples, 12×12×⅛ inches, were prepared at 425° F. and the following physical properties determined.

TABLE I

| Composition, percent: | | | | | |
|---|---|---|---|---|---|
| PVC | 100 | 80 | 50 | 50 | 50 |
| Graft | | 20 | 35 | 25 | 15 |
| SMA | | | 15 | 25 | 35 |
| Milling temp., ° F: | | | | | |
| Front roll | 360 | 380 | 380 | 380 | 390 |
| Back roll | 250 | 260 | 260 | 260 | 270 |
| Tensile, p.s.i.: | | | | | |
| Yield | 6,470 | 5,700 | 4,910 | 5,170 | 6,220 |
| Rupture | 6,470 | 4,500 | 4,180 | 5,170 | 6,220 |
| Heat distortion, ° C.: | | | | | |
| ASTM | 71.5 | 77 | 108.5 | 105 | 114 |
| Vicat | 88 | 92 | 117 | 121 | 126 |
| Modulus × 10³, p.s.i. | 4.7 | 3.0 | 2.4 | 2.7 | 3.2 |
| Elongation, percent | 1.4 | 3.3 | 3.0 | 2.0 | 2.2 |
| Notched impact, ft. lb./ins | 0.6 | 14.8 | 8.8 | 3.7 | 0.9 |

The improvement in heat deformation is quite evident from comparing the results in the last three columns to that in the first two. Heat deformation was determined according to ASTM test method D 648-56 as well as by the Vicat penetration test method D 1525-58T.

EXAMPLE 3

A series of tests were made with a composition similar to that of example 2, wherein the composition contained 50 percent PVC, 25 percent Graft and 25 percent SMA, in which the percent maleic anhydride in the copolymer was varied as well as the copolymer viscosity. The results are shown in table II.

EXAMPLE 4

Additional tests were made in which the proportions of the components were varied. The blending was done on 3 inch×8 inch rolls for 10 minutes (Front roll 380° F., back roll 280° F.) and the ground product compression molded at 420° F. as before. The components of example 2 were used.

TABLE II

| Percent maleic Anhydride | Viscosity of copolymer, cps. | Milling temp., ° F. Front roll | Milling temp., ° F. Back roll | Notched impact, ft. lbs./in. | Heat distortion, ° C. ASTM | Heat distortion, ° C. Vicat |
|---|---|---|---|---|---|---|
| 0 | 8 | 370 | 280 | 0.34 | 84 | 100 |
| 5.0 | 8 | 370 | 285 | 0.49 | 87 | 105 |
| 18.8 | 8 | 290 | 285 | 3.42 | 104.5 | 127 |
| 25 | 8 | 400 | 315 | 1.02 | 112 | 132 |
| 33 | 8 | (¹) | (¹) | | | |
| 0 | 4.05 | 375 | 275 | 0.25 | 89 | 105 |
| 5.0 | 4.0 | 385 | 260 | 0.52 | 84.5 | 103 |
| 18.0 | 4.0 | 385 | 260 | 1.96 | 105.5 | 123 |
| 24.9 | 4.27 | 390 | 305 | 1.43 | 123 | 136 |
| 33.3 | 4.0 | (¹) | (¹) | | | |
| 33.0 | 2.5 | 395 | 320 | 0.52 | 108 | 129 |

¹ Could not melt SMAC.

TABLE III

| Composition, percent | | | Notched impact, ft. lbs./in. | Heat distortion | |
|---|---|---|---|---|---|
| PVC | Graft | SMA | | ASTM | Vicat |
| 75 | 25 | 0 | 13.5 | 77.5 | 90 |
| 65 | 25 | 10 | 15.0 | 82 | 107 |
| 60 | 25 | 15 | 12.7 | 83 | 117 |
| 55 | 25 | 20 | 8.2 | 92 | 119 |
| 50 | 25 | 25 | 5.9 | 100.5 | 124 |
| 80 | 20 | 0 | 12.8 | 76.5 | 98.5 |
| 70 | 20 | 10 | 6.1 | 78 | 100 |
| 65 | 20 | 15 | 10.6 | 91.5 | 115 |
| 60 | 20 | 20 | 3.1 | 91 | 112 |

EXAMPLE 5

Additional experiments were made in which the graft polymer of example 1 was replaced with commercially available graft copolymers. Both Stylac XA 6705 and Krynac 900X1 are styrene-acrylonitrile graft copolymers of a butadiene based elastomer and Kane Ace B-12 is a methyl methacrylate-acrylonitrile graft copolymer of butadiene based elastomer. The results of ternary compositions prepared with polyvinyl chloride and a styrene-maleic anhydride copolymer containing 18 percent maleic anhydride and having a viscosity of 8 c.p.s. as shown below.

TABLE IV

| Composition | Stylac | Kane Ace | Krynac | |
| --- | --- | --- | --- | --- |
| % PVC | 50 | 50 | 60 | 50 |
| % Graft | 25 | 25 | 10 | 20 |
| % SMA | 25 | 25 | 30 | 30 |
| Impact, ft.lb/in. | 0.9 | 0.92 | 1.37 | 2.79 |
| Heat Distortion, ASTM, °C. | 116 | 122 | 95.5 | 99 |
| Tensile, p.s.i. (at break) | 5,870 | 5,290 | 5,200 | 4,325 |

Plasticizers, stabilizers and other additives such as pigments, fillers, colors, lubricants, mold release agents and the like may be employed in the ternary compositions of this invention.

What is claimed is:

1. A vinyl chloride resin composition having improved heat deformation and impact properties, said composition comprising a blend of
   a. from 50 to 75 weight percent of a vinyl chloride resin;
   b. from 10 to 35 weight percent of a polydiene rubber nitrile graft copolymer wherein said graft copolymer is prepared by polymerizing from 30 to 60 weight percent of a monomer mixture with from 70 to 40 weight percent of a polydiene rubber and wherein said monomer mixture comprises a vinyl nitrile monomer and at least one copolymerizable monomer in the weight proportions, respectively, of 15:85 to 35:65; and
   c. from 15 to 35 weight percent of an alkenyl aromatic/unsaturated anhydride copolymer having a viscosity of at least about 4 c.p.s. measured as a 10 percent by weight solution in methyl ethyl ketone, said anhydride copolymer prepared by polymerizing a monomer mixture containing about 15 to 30 weight percent of an unsaturated dicarboxylic acid anhydride and from 70 to about 85 percent of an alkenyl aromatic monomer.

2. The composition of claim 1 wherein said vinyl chloride resin is polyvinyl chloride, chlorinated polyvinyl chloride or a copolymer containing at least about 80 percent by weight of vinyl chloride and up to about 20 percent by weight of a copolymerizable monomer.

3. The composition of claim 1 wherein said polydiene rubber is a homopolymer of a conjugated diolefin, a copolymer of a mixture of conjugated diolefins or a copolymer comprising at least 60 weight percent of a conjugated diolefin or mixtures thereof with the balance to make 100 percent of at least one copolymerizable monomer.

4. The composition of claim 3 wherein said polydiene rubber is polybutadiene or a copolymer of butadiene and styrene.

5. The composition of claim 1 wherein said monomer mixture is a mixture of acrylonitrile and styrene or a mixture of acrylonitrile and methyl methacrylate.

6. The composition of claim 1 wherein said anhydride copolymer is prepared from maleic anhydride and an alkenyl aromatic monomer.

7. A polyvinyl chloride composition having improved heat deformation and impact properties, said composition comprising a blend of
   a. from 50 to 75 weight percent of polyvinyl chloride;
   b. from 10 to 35 weight percent of a polybutadiene nitrile graft copolymer wherein said graft copolymer is prepared by polymerizing from 30 to 60 weight percent of a monomer mixture with from 70 to 40 weight percent of polybutadiene and wherein said monomer mixture comprises acrylonitrile and at least one copolymerizable monomer in the weight proportions, respectively of 15:85 to 35:65; and
   C. from 15 to 35 weight percent of a copolymer of styrene and maleic anhydride having a viscosity of at least about 4 c.p.s. measured as a 10 percent by weight solution in methyl ethyl ketone at 25° C. and wherein the maleic anhydride comprises from about 15 to 30 weight percent of said copolymer.

8. The composition of claim 7 wherein said copolymerizable monomer in said monomer mixture is styrene or methyl methacrylate.

* * * * *

PO-1050
(5/69)

UNITED STATES PATENT OFFICE
CERTIFICATE OF CORRECTION

Patent No. 3,626,033      Dated December 7, 1971

Inventor(s) Henno Keskkula and Arthur A. Pettis

It is certified that error appears in the above-identified patent and that said Letters Patent are hereby corrected as shown below:

Column 2, line 52, in the formula delete "b" to read
-- $FeSO_4 \cdot 7H_2O$ -- line 65, change "polymers" to read -- copolymers --.

lines 69, 70 and 71, delete -- The anhydride and from about 85 to 70 weight percent of a monomer or monomers copolymerizable therewith. --

Column 4, in Table II, under heading "Milling temp., °F."
                                                       Front roll Change "290" to read -- 390 --.

In footnote 1, delete "C" to read -- SMA --.

Signed and sealed this 11th day of July 1972.

(SEAL)
Attest:

EDWARD M. FLETCHER, JR.
Attesting Officer

ROBERT GOTTSCHALK
Commissioner of Patents